July 22, 1952 S. J. BEGUN 2,604,548

APPARATUS FOR DEMAGNETIZING MAGNETIC RECORDING-REPRODUCING HEADS

Filed Dec. 5, 1946 2 SHEETS—SHEET 1

INVENTOR
S. J. BEGUN
BY Pineles & Greene
ATTORNEYS

INVENTOR
S. J. BEGUN
BY Pineles & Green
ATTORNEYS

Patented July 22, 1952

2,604,548

UNITED STATES PATENT OFFICE 2,604,548

APPARATUS FOR DEMAGNETIZING MAGNETIC RECORDING-REPRODUCING HEADS

Semi J. Begun, Cleveland Heights, Ohio, assignor to The Brush Development Company, Cleveland, Ohio, a corporation of Ohio Application December 5, 1946, Serial No. 714,156

1 Claim. (Cl. 179—100.2)

This invention relates to magnetic recording and reproducing of the kind utilizing a single magnetic core both for recording and reproducing.

Such a magnetic core is conventionally made of highly permeable metal and such metal under certain conditions develops permanently magnetizable characteristics.

Among the objects of this invention are novel magnetic transducers embodying various features for avoiding the difficulties arising when the magnetic heads retain permanent magnetization.

The foregoing and other objects of the invention will be best understood from the following description of exemplifications thereof, references being had to the accompanying drawings wherein.

The appearance of residual magnetism in a magnetic reproducing head causes a considerable increase in the noise level during a playback operation, apparently because the magnetic linkage between the moving record track and the magnetic core is not ideally uniform, and the variations in linkage is evidenced by a varying voltage or noise under the influence of the magnetic flux produced by the residual permanent magnetism.

The relatively high signal currents passing through the windings of the recording core during a winding operation are of a magnitude sufficient to leave relatively large amounts of residual magnetism especially where the high permeability metal of which the core is made, has been subjected to any appreciable amount of strain. Strain may be diminished to a large extent by constructing the magnetic metal core of a relatively large number of very thin laminations instead of a smaller number of thicker laminations, it appearing that the distortion of the core made of the larger number of thin laminations causes the thin laminations to slip with respect to each other and subjects the individual laminations to less strain.

It is exceedingly difficult to build and install any magnetic core without some degree of strain remaining, since even the clamping of the unstrained core in place will often cause strains to appear.

Figure 1:
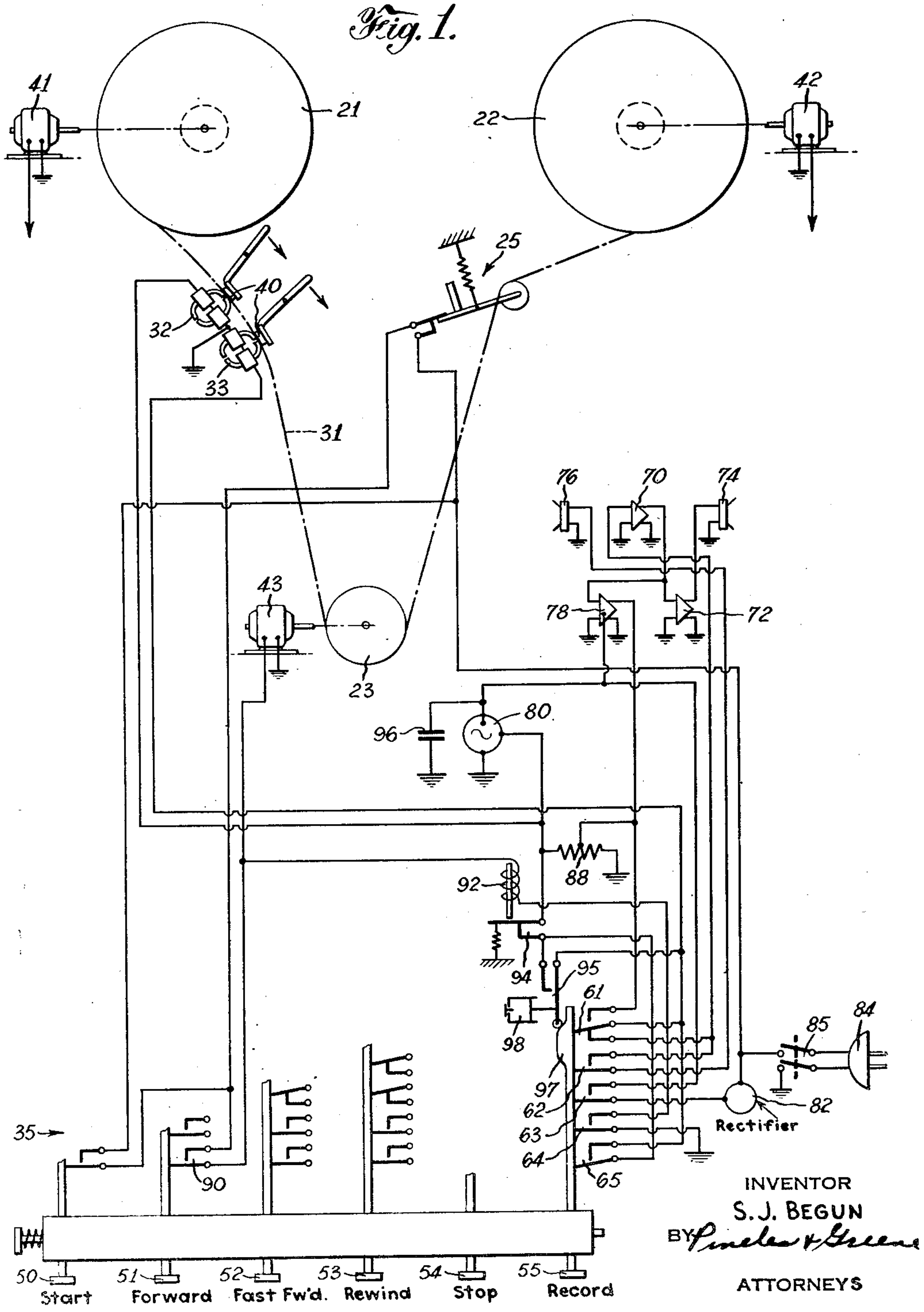
Fig. 1 is a diagrammatic illustration of one form of magnetic transducing apparatus according to the invention.

Fig. 1 diagrammatically illustrates a magnetic transducing apparatus in which provision is made for automatically demagnetizing the recording-reproducing core after it has been used for a recording operation so as to avoid the above defects.

According to this form of the invention, the record track 31 is shown as unwinding from a supply reel 21, moving past and in a magnetic linkage with an erasing core 32 and a recording-reproducing core 33, then around a capstan roller 23, a limit switch, generally indicated at 25, to be finally wound on a take-up reel 22 in a manner well known in the art. Flexible pads 40 which may be made of felt are shown as mechanically actuated to urge the record track 31 into better magnetic contact with each of the cores. The supply reel 21, take-up reel 22 and capstan roller 23 are shown as actuated by motors 41, 42, and 43 respectively. Switch assembly 35 is shown as providing the necessary control switches for establishing the power circuits to the various motors as well as controlling the recording, erasing and reproducing circuit connections to the windings of the magnetic cores. The motor actuation circuits are not completely illustrated since any suitable arrangement may be employed. One such complete wiring connection is shown in the copending Begun application, Serial No. 723,374, filed January 21, 1947.

In the switch assembly 35, a series of switch push rods 50, 51, 52, 53, 54 and 55 may be used, the push rod 50 being used for starting a reeling operation and the others being used to control respectively, the normal or slow forward reeling, fast forward reeling, rewinding, stopping and recording as indicated. The switches of the assembly are mounted so as to operate by the actuation of the rods to effect the desired switching. Switch push rods 51 through 55 may be mounted as an assembly mechanically interconnected so that the inward actuation of any one push rod will automatically cause all the others to be released from inward actuated position, and to be propelled outwardly to the deactivated position under the influence of suitable biasing forces, as indicated in the above mentioned application.

The start push rod 50 may merely be biased outwardly and otherwise mechanically disconnected from the assembly of push rods 51 through 55. The record push rod 55 may be arranged so that in its outward position in which it is shown it establishes playback circuit connections to the cores, and in its inward position it establishes recording circuits.

In the playback outer position of the push rod 55, the windings of the core 33 which have one terminal grounded have their other terminal connected to the input of preliminary amplifier 70 through the switch blade 61. The output of the preliminary amplifier 70 is connected to the input of auxiliary playback amplifier 72, the output of which in turn is connected to a signal reproducer, such as loud speaker 74. In the recording inner position of the push rod 55, the signal source, such as microphone 76, is connected to the input of the preliminary amplifier 70 by means of the switch blade 62, and the output of preliminary amplifier 70 is fed through the auxiliary recording amplifier 78 to the core 33 by means of the switch blade 61. A high frequency oscillator 80 has its output connected to the erasing core 32, and with push rod 55 in the record position B+ power is supplied to this oscillator by means of the switch blade 63 and a rectifier 82 fed from the main power supply through connecting plug 84 and switch 85. A fraction of the high frequency erasing currents may be taken from the potentiometer 88 connected across the high frequency output to provide the necessary high frequency bias for the amplified recording currents as indicated. The switch 63 may also be used to supply B+ power to the auxiliary recording amplifier 78 as shown when the push rod 55 is in the inward record position.

Amplifiers 70 and 72 may at all times be left connected with the B+ power supply by connections, not shown, to enable monitoring of the signals being recorded by listening to the output of the signal reproducer 74. However, where such monitoring is not desired, the B+ power supply to auxiliary playback amplifier 72 may be disconnected, for example, by the blade 63 when push rod 55 is set for recording. The power supply to the auxiliary recording amplifier 78 may also be connected regardless of the position of the push rod 55 if care is taken to prevent undesired amplified playback signals put out by this amplifier during a playback operation from affecting the operation. This disturbance may be avoided by carefully shielding the amplified output signal lead of amplifier 78, or by establishing the connection between this lead and the potentiometer 88 through an auxiliary switch operated by the push rod 55.

Actuation of the capstan motor 43 is shown as effected by connections through a switch 90 operated by forward push rod 51 and in series with one of the switches of the limit switch assembly 25. A relay 92, the windings of which are in parallel with the capstan motor 43 and in series with the "record" push rod operated switch 64, has its relay switch 94 connected to feed the entire high frequency oscillator output through the delay switch 95 to the recording-reproducing core 33 when the windings of the relay 92 and the capstan motor 43 are inactivated with the "record" push rod in the "record" position. The blade of the delay switch 95 is arranged for operation to the circuit closing position by a cam lobe 97 on push rod 55 whenever the push rod is in its inward record position. A time delay mechanism, such as dash pot 98, may be connected to the switch 95 so as to retain the switch in the closed position for a short period of time after the cam-shaped surface 97 has released its blade. The time delay may be built into the cam lobe by shaping it so that the switch 95 is held closed till after the switch 64 has been operated to its circuit opening position. Friction means may be employed to slow the outward travel of the push rod 55 under the ejecting action of its biasing spring which may also be made weaker to further prolong the travel.

The switch 95 should be permitted to open when the push rod 55 is in its outermost position, as shown, so as to normally leave the high frequency shunting circuit open even in the inactivated condition of the relay when the relay switch 94 is closed. When the capstan motor 43 and the windings of the relay 92 are activated, the switch 94 is held open so that the high frequency shunt is inoperative. In place of the cam-operated switch 95, a conventional switch, such as switch 65, having a blade directly connected to the push rod 55 may be used, the contacts of switch 65 being arranged as by mountings on flexible arms so biased that switch 65 does not open till after switch 64 opens.

A suitable energy storing device shown as a capacitor 96 is connected across the B+ supply of the oscillator 80 so that when the B+ supply from the rectifier 82 is broken enough power is stored to continue to cause oscillator 80 to provide oscillations for a small interval of time.

The apparatus, as shown, incorporates a feature which prevents inadvertent erasure of, or superimposed recording on, a previous recording. For effecting a recording operation both push rods 51 and 55 must be operated to their inward positions simultaneously, an operation which is not easy to perform accidentally or inadvertently. This factor is described and claimed in the copending Dank application, Serial No. 690,878, filed August 16, 1946, now Patent No. 2,535,486, granted December 26, 1950. When set for recording, the capstan motor 43, the windings of relay 92 and the oscillator 80 are activated, shunting switch 95 is closed, and shunting switch 94 is open.

A recording operation may be completed by withdrawal of the forward push rod 51, or record push rod 55, as by inadvertent or intentional actuation of another push rod. Termination of a recording may also be effected by the operation of the limit switch assembly 25 caused by the complete unwinding of the record track 31, or by interruption of the entire power supply, as by opening of the switch 85 or withdrawal of the plug 84.

Any such interruption causes the windings of relay 92 to be deactivated, and switch 94 immediately closes. Switch 95 will also be closed either because the push rod 55 is in its inward record position, or if push rod 55 has been retracted to its outer position the time delay means 98 or cam 97 will have restrained the blade of switch 95 against immediate movement. In any case, the high frequency shunt will be immediately established upon the termination of a recording operation no matter how effected. Since oscillator 80 will maintain its output at least for a short period of time after the termination of the recording operation, the high frequency output will be momentarily fed in full strength to the core 33 so as to effectively demagnetize it.

In this manner, any residual magnetism remaining in the recording-reproducing core will be effectively eliminated and will not interfere with any playback operation which may follow. Since it is only after a recording operation that any tendency to retain permanent magnetization is apparent, it will be evident that the apparatus of Fig. 1 will completely eliminate the prior art difficulties. If the oscillator 80 of the construction illustrated is of the space discharge type, such as the conventional vacuum tube oscillator, the cathode of the tubes should have sufficient thermal inertia so as to continue in operation for a short time after the filament heater current is interrupted. The tubes, however, may also be of the battery-operated directly heated type in which the filament constitutes the cathode, the filaments being then supplied from the B+ so that the energy storing capacitor 96 will not only continue to supply the B+ power for plate operation, but also for filament operation, after the external supply is cut off.

The period during which the pulse of demagnetizing current is passed through the recording-reproducing core 33 need not be very long, time as little as $\frac{1}{10}$ of a second or even less being adequate to effect suitable demagnetization.

The pulse of demagnetizing current will, of course, effect demagnetization on that portion of the record track which is in magnetic linkage with the core 33 when the pulse passes through its windings. However, just beyond the end of a recording sequence there will, in general, be no recorded matter on the record track. In fact, if there be such previously recorded matter its erasure will help to suitably space the new recording form the old and make it unnecessary to terminate playback operations at a critical moment to avoid the disturbing effect of a previous and undesired recording suddenly appearing after the desired recording has been completely played back. To provide for such suitable isolation of the new recording, the demagnetizing pulse may be lengthened to as long as several seconds, or even longer if desired. The length of the pulse may be adjusted by varying the capacitance 96 and the time delay of the dash pot 98 or the movement of lobe 97.

Other time delay mechanisms, such as a space discharge tube controlled by a resistor-capacitor time delay circuit may be employed if desired, in place of those shown.

Although an electrical storage means has been shown for maintaining the space discharge oscillator operating after the interruption of the power feed, other means such as rotary high frequency generators may be substituted, in which case the inertia of the rotating parts may be utilized to maintain the high frequency output for a short time after deenergization. The high frequency current supply maintenance factor may be entirely omitted if desired.

The transducing features according to the invention may also be used where a recording is to be superimposed on a previous recording, as for example, if editorial or other matter is to be inserted. For such purposes the duration of the demagnetizing pulse may be shortened so as to make it possible to inject the added matter during a playback operation. For example, the original recording may be played back to the point where the insert is to be made, at which time the "record" push rod 55 is promptly actuated to the inward record position while the forward reeling is maintained as by keeping the "forward" push rod 51 in its inward position during the unlatching caused by the inward actuation of the push rod 55. After all the added matter has been recorded the initial recording may be checked by promptly resuming the playback operation without interrupting the forward reeling. This may be performed by retracting the "record" push rod 55 as by moving the "stop" push rod 54 to its inward position to unlatch the other push rods while preventing the retraction of "forward" push rod 51.

Shortening the demagnetizing pulse prevents unintentional erasure of the original recording adjacent the added matter. Where the same apparatus is desired to provide either the long isolating pulses or the short editing pulses there may be provided means for adjusting the pulse duration as by an adjustment on the release time of the dash pot 98.

Figure 2:
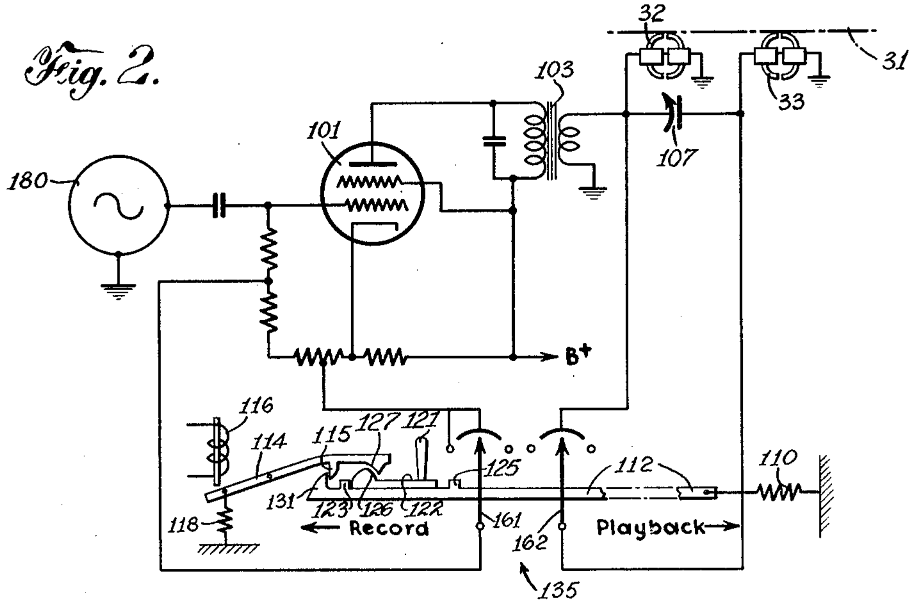
Fig. 2 is a diagrammatic illustration of a modified form of transducing apparatus embodying the invention.

Fig. 2 diagrammatically illustrates a portion of a modified apparatus according to the invention. The erasing core 32 and transducing core 33 are here shown as connected in a slightly different manner to a high frequency oscillator 180 by means of an amplifier circuit including a space discharge tube 101, and an output coupling means shown as the transformer 103. A portion of switch 135 is shown as controlling the high frequency output, the switch having a series of mechanically linked switch arms of which only two, 161, 162, are shown. Arms 161 and 162 each move over a series of three contacts. Counter-clockwise rotation of the arms to the left-hand set of contacts establishes recording conditions and circuits, and clockwise rotation to the right-hand series of contacts establishes playback conditions and circuits.

The windings of the erasing core 32 are directly connected to the output of the coupling transformer 103, which in turn feeds the A. C. bias through a capacitor 107 to the transducing core 33. Switch arm 162 together with its intermediate contact are connected so as to shunt the capacitor 107 and thereby establish direct feed of the entire oscillator output to the transducing core. The grid of tube 101 is normally held at such a high negative bias with respect to its cathode as to prevent passage of any high frequency current to the output transformer 103, as by means of the B+ dropping resistors shown. With the switch 135 in the record position, however, switch arm 161 is arranged to lower the grid bias to such an extent as to permit tube 101 to pass as well as amplify the output of oscillator 180.

The tube 101 may take the place of the oscillator amplifier normally used.

Additional switch means may be provided to establish the amplifier and motor control circuits as indicated above in connection with Fig. 1. The switch arms of the switch 135 may be biased toward the playback position by the spring 110 connection to link 112 and latch means, such as a latch bar 114 having a latch projection 115, may be arranged to engage a shoulder 113 on the link 112 and to retain it in the record position under the influence of a relay 116 and against the resistance of a spring 110 whenever the apparatus is properly set for recording. The relay 116 may be arranged to be sensitive to the termination of a recording operation, such as by being connected in parallel to the capstan motor, as indicated above.

The switch 135 may be operated by a knob 121 mounted on a slide 122 movable between the stops 123 and 125. The slide 122 is shown as provided with a cam surface 126, which engages a cooperating cam surface 127 on the latch bar 114 for lifting the latch bar or away from engagement with the shoulder 113 of the link 112, when the knob is moved in the playback direction. Actuation of the knob 121 in the record direction will cause the opposing cam surfaces to engage each other to lift the latch bar 114 and permit the movement of the link 112 to the record position even though the latch bar 114 is being urged to the latching position by the relay 116.

In the operation of the apparatus as shown in Fig. 2, deactivation of the relay 116 as by the termination of recording sequences effects the unlatching of the switch arm link 112 to permit the switch arms to rotate in a clockwise direction. As the arms 161 and 162 move across their intermediate contacts, the capacitor 107 is shunted by arm 162 and the tube 101 passes current because of the decrease in bias effected by the arm 161. A surge of demagnetizing current accordingly passes momentarily through the windings of the transducer core 33. The interruption of the recording by moving the switch 135 to the playback position also causes the demagnetizing surge to pass through the recording core even though the reeling is not interrupted.

In accordance with the invention, the transducing of records may be effected with a uniformly excellent signal-to-noise ratio.

In the construction of Figs. 1 and 2 low frequency currents may also be used to effect a demagnetization of the recording-reproducing core 33. Even 60 cycle currents may be used by arranging the circuit so that the demagnetizing pulse has an initial magnitude and decay characteristics over a sufficient number of current cycles to effect the desired demagnetization. The use of a 60 cycle erasing pulse together with an erasing core also suitable for use with 60 cycle erasing currents, such as is taught in the above mentioned Begun application enables the simple construction of a magnetic transducer which does not require a high frequency current amplifier used to provide the large amounts of erasing currents ordinarily needed.

The switch arm 162 may be used to provide some of the recording and playback circuit connections in its extreme positions. The intermediate contacts of the switch arms may be elongated as shown in Fig. 2, if it is desired to prolong the demagnetizing pulse.

The commencement of the recording operation with the apparatus of Fig. 2, as by moving the switch arm link 112 from the playback position to the record position will cause an initial demagnetizing pulse to be fed to the recording head as the switch arms 161, 162 move across their intermediate contacts. This happens because the oscillator 180 may be maintained in oscillation regardless of the setting of the control switches. This initial demagnetizing pulse has the effect of insuring a suitable spacing before the recording and this preliminary spacing has advantages similar to the final spacing considered above in connection with Fig. 1. This initial demagnetizing pulse may be avoided if desired, as by arranging that the oscillator 180 is set into operation as by the supplying of power, only when the switch assembly 135 is in the record position and by supplying a time delay mechanism, such as is described above in connection with Fig. 1 to prevent a de-energization of the oscillator 180 until a small time interval has elapsed after setting the switch assembly 135 back to the record position.

The construction of Fig. 1 may also be modified so as to provide an initial demagnetizing pulse, as for example by eliminating the switch 63 and establishing direct feed of B+ power to the oscillator 80 regardless of the conditions of switch assembly 35. The commencement of a recording operation may then be effected by moving the push rods 51 and 55 to their inward positions and then actuating the start push rod 50 to shunt the limit switch 25, as indicated in the above-identified Begun application. In the time interval between operation of push rod 55 to close switch 64 and operation of push rod 50 to open switch 94, a demagnetizing current will flow through the recording-reproducing core 33. By incorporating a time delay in the response at relay 92, the time interval will be lengthened and will cause erasure of an appreciable length of the record track.

It is not essential that the demagnetizing current surge shall have a magnitude corresponding to that of the erasing current. Since the tendency for retaining permanent magnetism is usually not excessive, the amplitude of the demagnetizing surge may merely be of the order of the amplitude of the biasing current.

Figure 3:
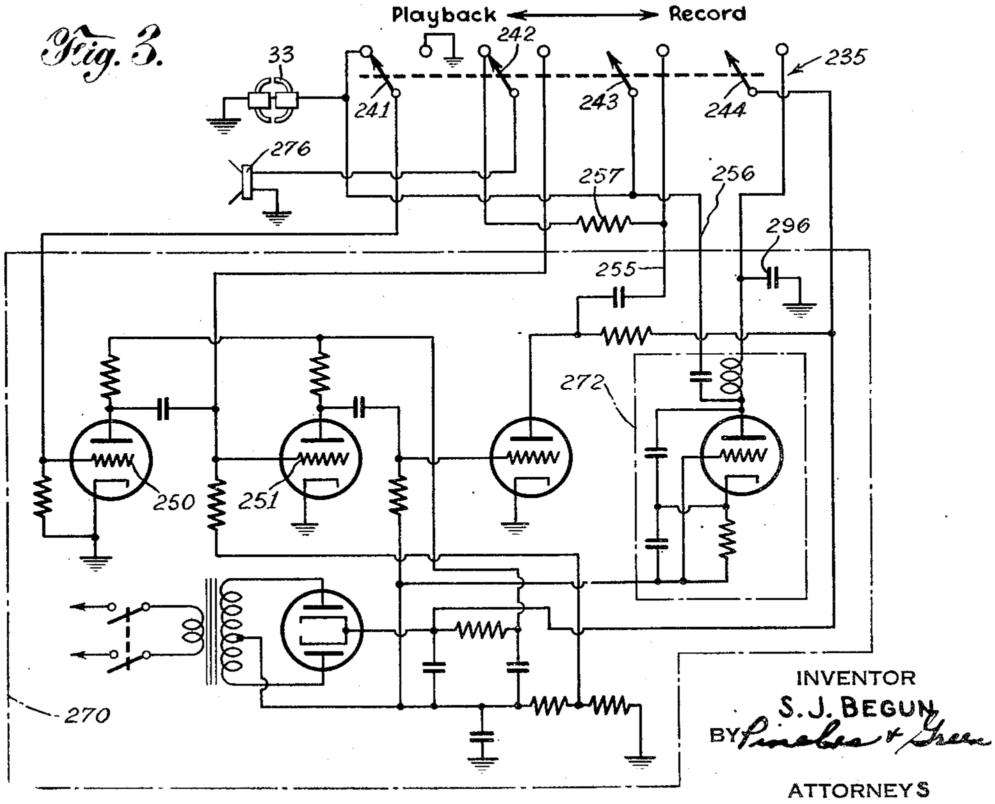
Fig. 3 illustrates a further form of the invention.

Fig. 3 shows another form of the invention in a magnetic transducing apparatus in which the A. C. bias is used for demagnetizing a recording-reproducing core 33 and no erasing or erasing current need be used.

Fig. 3 shows in a diagrammatic manner the recording-reproducing core 33 inter-connected with a signal transducer 276, a switch assembly 235 and an amplifier and bias circuit indicated generally as 270.

The signal transducer 276 may be of the type that will operate both as a microphone for converting sound signals to electrical signals and as a speaker for converting electrical signals to sound signals. A piezo electric crystal transducer is suitable for such operation. The switch assembly 235 is shown as including four mechanically connected poles all movable together from a left-hand playback position to a right-hand record position. In the playback position pole 241 connects the magnetic core windings with the input grid 250 of an amplifier circuit while the amplifier output 255 is connected through resister 257 and switch pole 242 to the transducer 276, the circuits being completed by the ground connections shown.

In the record position switch pole 244 establishes a B+ power supply to an oscillator 272 while switch pole 242 connects the transducer 276 to the input grid 251 of amplifying stages, the output of which at 255 is connected to the magnetic core windings through the switch blade 243. The oscillator output 256 is maintained in communication with the magnetic core windings so as to provide the necessary signal bias in a recording operation when the oscillator is energized into operation by means of switch blade 244. During a playback operation the oscillator is not energized so that it does not effect the playback even though it is connected to the core windings.

A capacitor 296 is shown as connected across the B+ supply of the oscillator 272 to act as an energy storing device in the manner indicated above in connection with Fig. 1. When a recording operation is stopped the oscillator 272 continues to supply high frequency biasing currents to the windings of the magnetic core 33 even though the recording is stopped by movement of the switch assembly 235 away from the record position to disconnect the B+ supply from the oscillator. The continued passage of biasing current through the magnetic core windings effectively neutralizes any tendency for retaining permanent magnetism to such an extent that it no longer effects the operation of the apparatus to any appreciable extent.

The remaining details of the amplifier and oscillator circuits are not a part of the present invention and any suitable constructions may be employed.

The magnetic core constructions used in the apparatus of Figs. 1, 2 or 3 may be of any suitable type, such as those shown in the Begun application, Serial Number 688,738, now Patent No. 2,513,617, granted July 4, 1950, filed August 6, 1946, or the Kornei application, Serial Number 688,034, now Patent No. 2,523,576, granted September 26, 1950, filed August 2, 1946. The magnetic heads of these applications include one or more magnetic laminations having interlinked windings and mounted in a unitary structure containing record track guides.

Additional refinements may be made to improve the quality of the recording. To insure that the record track is always properly aligned with respect to the pole face of magnetic cores within the side walls of the record track guides, it is advantageous to bias the record track toward, and guide it along, only one of the side walls. Since the width of the record track guide path between the side walls may be slightly longer than the width of the tape and may vary the record track may be permitted to change its transverse position and be magnetically linked with the magnetic cores along different portions of its width without this bias feature. Appreciable noise reduction results from the maintenance of the cores along a constant transverse position of the track.

Another helpful expedient is the construction of the magnetic head mounting, so as to permit the non-magnetic gap regions to be adjusted transversely, as well as angularly with respect to the guide path. With such construction it is a simple matter to adjust all the heads so that their gaps are at the same accurately set angular and transverse position with respect to the guide path, or with respect to the guide wall if the track is to be biased against only one wall. The reproduction of the recording is adversly effected by having the transversely extending non-magnetic playback gap set at an angle different from the angular setting of the non-magnetic gap of the head used for recording; different signals recorded at different instants on adjacent longitudinal portions of the track will be picked up and played back at the same instant. Setting a constant angle such as a right angle with respect to the guide wall eliminates this difficulty.

The effective erasing head pole face width transverse to the record track may be greater than the corresponding width of the recording-reproducing head pole face to insure that the recording (and reproducing) is effected on a portion of the record track that has been properly erased. Such a ratio of relative widths also permits of some variation in the relative transverse positioning of the heads, without affecting the quality of the transducing.

The pole faces of the heads may alternatively be of the same width in which case they should have a common guide surface or surfaces along which the record track is guided. For best results both heads and common guides may be incorporated in a single unitary assembly.

Additionally, the magnetic contact between the record track and the non-magnetic gap regions of the magnetic core may be considerably improved by honing the pole faces to produce an exceedingly smooth surface. With record tracks to the form of tape, pressure pads of resilient material such as felt should be used to improve the magnetic linkage as described in the copending Dank application, Serial Number 690,878, filed August 16, 1946. In place of the pads, rollers may be used to press the record track against the magnetic core and improve the magnetic linkage.

It will be apparent to those skilled in the art that the novel principles disclosed herein in connection with specific exemplifications thereof will suggest various other applications and modifications of the same. It is accordingly desired that in construing the breadth of the appended claim they shall not be limited to the specific exemplifications of the invention described herein.

I claim:

In a magnetic recording and reproducing system, transducer head means for recording and reproducing signals, bias means comprising a source of constant frequency alternating current connected to said transducer head means for energizing said transducer head means during recording, signal means comprising a source of variable energy representing the signal to be recorded for energizing said transducer head means during recording simultaneously with said bias means, first switch means connected to said signal means for disconnecting said signal means from said transducer head means, second switch means connected between said bias current source and said transducer head means, time delay means connected to said bias means and to said second switch means, and circuit means interconnecting said first and second switch means for operating said second switch means in response to the operation of said first switch means whereby after operation of said second switch means alternating bias current of decaying amplitude and of a duration sufficient for at least three polarity reversals energizes said transducer head means.

S. J. BEGUN.

REFERENCES CITED

The following references are of record in the file of this patent:

UNITED STATES PATENTS

| Number | Name | Date |
|---|---|---|
| 1,867,225 | LeVan | July 12, 1932 |
| 2,224,854 | Begun | Dec. 17, 1940 |
| 2,336,886 | Peterson | Dec. 14, 1943 |
| 2,351,004 | Camras | June 13, 1944 |
| 2,351,005 | Camras | June 13, 1944 |
| 2,411,849 | Camras | Dec. 3, 1946 |
| 2,418,541 | Camras | Apr. 8, 1947 |

FOREIGN PATENTS

| Number | Country | Date |
|---|---|---|
| 70,902 | Norway | Nov. 5, 1942 |
| 97,306 | Sweden | Nov. 7, 1939 |
| 875,721 | France | Oct. 1, 1942 |
| 880,559 | France | Mar. 3, 1943 |

OTHER REFERENCES

Fiat Final Report No. 705, Jan. 1946, pages 11 and 12.

Scientific Papers of the Bureau of Standards No. 78, pages 221–230.